Patented Feb. 20, 1934

1,948,183

UNITED STATES PATENT OFFICE 1,948,183

PRODUCTION OF ANTHRAQUINONE DERIVATIVES

Paul Nawiasky and Artur Krause, Ludwigshafen-on-the-Rhine, and Berthold Stein, Mannheim, Germany, assignors to General Aniline Works, Inc., New York, N. Y., a corporation of Delaware No Drawing. Application April 24, 1931, Serial No. 532,696, and in Germany May 3, 1930

8 Claims. (Cl. 260—60)

The present invention relates to a process for the production of valuable anthraquinone derivatives.

For the preparation of 2-alkoxy derivatives of 1.4-diaminoanthraquinone it has already been proposed to treat 1.4-diaminoanthraquinone-2-sulphonic acid or its N-substituted derivatives of the general formula:

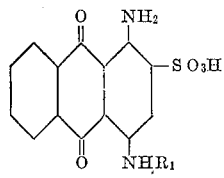

in which $R_1$ is hydrogen, alkyl or a sulphonated or non-sulphonated aryl radicle, with solutions in monohydric alcohols of alkali metals or alkali metal hydroxides.

We have now found that valuable derivatives of 1.4-diaminoanthraquinone are obtained by treating 1-amino-4-arylsulphamido-anthraquinone-2-sulphonic acids with dilute alkali metal alcoholates, i. e. solutions in mono- or polyhydric alcohols of alkali metals or alkali metal hydroxides. Generally speaking the 1-amino-4-arylsulphamido-2-alkoxyanthraquinones are formed as the final products, so that no saponification of the acyl group takes place. The reaction is usually carried out at temperatures between 50° and 120° C. preferably between 70° and 100° C. The alcohols are preferably chosen from the lower members of the aliphatic series. The resulting acyl derivatives are valuable initial materials for the manufacture of dyestuffs but may also be used as dyestuffs themselves.

The following examples will further illustrate how this invention may be carried out in practice, but the invention is not restricted to these examples. The parts are by weight.

Example 1

10 parts of 1-amino-4-para-toluenesulphamido-anthraquinone-2-sulphonic acid (obtainable for example by the action of para-toluenesulphamide on 1-amino-4-bromanthraquinone-2-sulphonic acid) are introduced at 80° C. into a melt obtained by dissolving 30 parts of caustic potash in 60 parts of methyl alcohol, the whole then being further treated at the same temperature until a sample diluted with water no longer dissolves therein. The melt is then poured into cold water and worked up in the usual manner by filtration by suction and washing. The resulting condensation product is 1-amino-2-methoxy-4-para-toluenesulphamidoanthraquinone which forms bluish-red crystalline needles and dissolves in alcohol giving a scarlet colouration. When caustic soda is added the colour changes to violet with the formation of the sulphamide sodium salt. When the resulting compound is dissolved in concentrated sulphuric acid the toluenesulphonic acid radicle is split off. By adding water to the sulphuric acid solution very pure 1.4-diamino-2-methoxyanthraquinone is obtained.

Example 2

10 parts of 1-amino-4-para-toluenesulphamido-anthraquinone-2-sulphonic acid are introduced at 80° C. into a melt obtained by dissolving 30 parts of caustic potash in 60 parts of ethylene glycol and the whole is further treated at the same temperature until initial material can no longer be detected in a sample withdrawn and worked up. The melt is then worked up as described in Example 1. The resulting condensation product is, according to its properties, the 2-monoglycolether of 1-amino-4-para-toluenesulphamido-anthraquinone. It may be crystallized from dilute acetic acid and is then obtained in the form of red crystals having a melting point of from 197° to 199° C.

What we claim is:—

1. The process for the production of anthraquinone derivatives which comprises heating 1-amino-4-p-toluenesulphamido-anthraquinone-2-sulphonic acid with a dilute alkali metal alcoholate.

2. The process for the production of anthraquinone derivatives which comprises heating 1-amino-4-p-toluenesulphamido-anthraquinone-2-sulphonic acid with caustic potash in methyl alcohol.

3. The process for the production of anthraquinone derivatives which comprises heating 1-amino-4-p-toluenesulphamido-anthraquinone-2-sulphonic acid with caustic potash in ethylene glycol.

4. The process for the production of anthraquinone derivatives which comprises heating an 1-amino-4-X-sulphamido-anthraquinone-2-sulphonic acid in which X stands for a radical of the benzene series with a dilute alkali metal alcoholate.

5. 1-amino-4-X-sulphamido-2-alkoxy-anthraquinones in which X stands for a radical of the benzene series.

6. 1-amino-4-p-toluenesulphamido-2-alkoxy-anthraquinones.

7. The process for the production of anthraquinone derivatives which comprises heating an 1-aminoanthraquinone-2-sulphonic acid containing in the 4-position an arylsulphamido radicle of the benzene series with a dilute alkali metal alcoholate.

8. 1-amino-2-alkoxyanthraquinones containing in the 4-position an arylsulphamido radicle of the benzene series.

PAUL NAWIASKY.
ARTUR KRAUSE.
BERTHOLD STEIN.